United States Patent [19]

Skubon et al.

[11] 3,922,245

[45] Nov. 25, 1975

[54] WASH COATING FOR SAND CORES AND SAND MOLDS CONTAINING A RUBBER POLYMER

[75] Inventors: Michael J. Skubon; John J. Spiwak, both of Columbus; Rodney L. Naro, Worthington, all of Ohio

[73] Assignee: Ashland Oil, Inc., Ashland, Ky.

[22] Filed: Apr. 26, 1974

[21] Appl. No.: 464,572

[52] U.S. Cl........ 260/33.8 UA; 117/5.2; 260/42.43; 260/42.47; 260/42.52
[51] Int. Cl.$^2$...................... B05D 1/00; C08K 5/02
[58] Field of Search......... 260/33.8 UA, 998.18, 42, 260/47, 42, 43, 52; 117/5.2, 5.1, 5.3; 164/72

[56] References Cited
UNITED STATES PATENTS

| | | | |
|---|---|---|---|
| 3,541,042 | 11/1970 | Levy | 260/33.8 UA |
| 3,654,190 | 4/1972 | Levine | 260/42.47 |

OTHER PUBLICATIONS

Gardner et al.–Paint Testing Manual (13th ed.) (1972), (ASTM) (Philadelphia), pp. 133 and 135.

Modern Plastics Encyclopedia 1968 (McGraw–Hill) (N.Y.), pp. 426–427.

*Primary Examiner*—Donald E. Czaja
*Assistant Examiner*—H. H. Fletcher

[57] ABSTRACT

Disclosed is a wash coating composition to be applied to the surfaces of foundry sand cores and molds to reduce their deterioration from handling and exposure to atmospheric humidity. The coating comprises an organic liquid which can be a chlorinated hydrocarbon, a suspending agent which can be a clay, a vegetable gum or an amine-treated bentonite, a refractory powder which can be graphite, coke, mica, silica, alumina, magnesia, talc or zircon flour, and an organic polymer or copolymer which can be a vinyl toluene/- butadiene copolymer, styrene/butadiene co-polymer, vinyl toluene/acrylate copolymer, styrene/acetylene copolymer, straight acrylates and styrene/butadiene copolymers.

2 Claims, No Drawings

WASH COATING FOR SAND CORES AND SAND MOLDS CONTAINING A RUBBER POLYMER

NATURE OF THE INVENTION

This invention relates generally to foundry cores and molds. More specifically it is concerned with a novel wash which can be applied to mold and core surfaces.

PRIOR ART

The term "core wash" is generally used in the foundry industry to denote refractory materials applied in a liquid carrier to shaped bonded aggregates, such as sand cores and molds. The primary functions of a core wash are to improve the surfaces of castings made from the molds and cores treated with a wash, and to reduce the cost of cleaning castings. Secondarily, a core wash functions to harden the surface of the shaped bonded aggregate thereby protecting the surface from metal erosion during the metal casting process.

The components of most core washes will include a refractory, a liquid vehicle, a suspending agent, and a binder. In addition other materials such as fungicides, wetting agents, defoaming agents and odor masking and scenting agents may be included.

The refractory material can be graphite, coke, mica, silica, aluminum oxide, magnesium oxide, talc, zircon flour and mixtures of these materials. The vehicle ordinarily is either water or organic solvent. The suspending agent is determined in part by the liquid vehicle used, but can consist of clay or a vegetable gum. The binder serves to bond the refractory particles together after the vehicle has been removed from the core surface by baking, ignition, or air drying. The type of binder used is also determined in part by the vehicle used. If the vehicle is water, high molecular weight carbohydrates, salts of high molecular weight organic acids, organic resin salts and high molecular weight polymers are used.

In the last few years new organic and inorganic binder formulations for bonding foundry sands into cores and molds have been developed. Cores and molds made with some of these new sand binders, however, have tended to deteriorate under the effect of moisture absorbed upon prolonged exposure to the atmosphere. This deterioration is manifested by a progressive decline in core tensile strength during storage. In order to reduce moisture absorption, solutions of resins in volatile solvents have been applied to core and mold surfaces, but such solutions have not been a complete answer to the problem.

OBJECT OF THE INVENTION

A primary object of this invention is to provide a core wash that is compatible with both organic and inorganic core binders sensitive to water vapor.

Another object of this invention is to render shaped bonded aggregates, such as foundry cores and molds, insensitive to atmospheric moisture by covering the surface of the core with a moisture-impenetrable film.

SUMMARY OF THE INVENTION

Briefly stated our invention in one aspect constitutes a core wash comprising:
1. An organic liquid;
2. A suspending agent;
3. A refractory material; and,
4. An organic polymer or copolymer.

In a second aspect our invention comprises a method of treating a foundry core or mold sensitive to moisture by coating the surface of sand core or mold with a wash of the foregoing composition.

DETAILED DESCRIPTION OF THE INVENTION

As stated above in one aspect our invention comprises a core and mold wash whose primary components are an organic liquid, a suspending agent, a refractory material, and an organic polymer or copolymer. In addition, however, the core wash composition can also include such secondary components as fungicides, wetting agents, defoaming agents and odor masking and scenting agents.

The liquid vehicle as previously noted, is an organic liquid. Any organic solvents having a kauri-butanol value (ASTM D 1133) of 36 or higher can be used. We prefer a chlorinated hydrocarbon such as 1, 1, 1-trichloroethane, methylene chloride, and mixtures of these.

As to the suspending agent, any of the commercially available suspending agents can be used such as clay, vegetable gums, or amine-treated bentonite. We prefer the amine-treated bentonite and prefer a ratio by weight of suspending agent to organic liquid of between about 1 to 80 and about 1 to 250.

The refractory powder used is any of those presently used and can be graphite, coke, mica, silica, aluminum oxide, magnesium oxide, talc, and zircon flour. We prefer a blend of graphite and talc in a weight ratio of refractory to organic liquid of between about 1 to 2.5 and 1 to 3.5.

The organic polymer or co-polymer used can, for example, be a vinyl toluene/butadiene polymer, styrene/butadiene copolymer, vinyl toluene/acrylate copolymer, styrene/acetylene copolymers, straight acrylates, and styrene/butadiene copolymers. Of these we prefer the vinyl toluene/butadiene polymer. Generally the ratio by weight of polymer or copolymer to an organic liquid vehicle should be between about 1 to 50 and about 1 to 200.

EXAMPLE 1

In the following table are presented some representative core wash formulations utilizing an organic liquid as the vehicle and a variety of refractory materials. In these formulations the vehicle was 1, 1, 1-trichloroethane, the polymer was vinyl toluene/butadiene polymer, and the dispersing agent was an amine treated bentonite clay. The formulations shown in the table yielded core washes having appropriate viscosities and adhering well to the core and mold surfaces.

| FORMULATION | 1 | | | 2 | | 3 | |
|---|---|---|---|---|---|---|---|
| | Weight Percent | Weight Ratio[1] | | Weight Percent | Weight Ratio | Weight Percent | Weight Ratio |
| Refractory | | | | | | | |
| Mexican Graphite | 21.8 | | | | | 10.7 | |
| German Graphite | | | | | | 12.7 | |

-continued

| FORMULATION | 1 | | 2 | | 3 | |
|---|---|---|---|---|---|---|
| | Weight Percent | Weight Ratio[1] | Weight Percent | Weight Ratio | Weight Percent | Weight Ratio |
| White Talc | 3.0 | | | | 1.5 | |
| Proprietary Mineral "A" | | | 30.3 | | | |
| Zircon Flour | | | | | | |
| Calcined Kaolinite | | | | | | |
| Calcined Alumina | | | | | | |
| TOTAL | 24.8 | 3.0 | 30.3 | 2.2 | 24.9 | 3.0 |
| Polymer | 0.8 | 94.3 | 0.9 | 72.2 | 0.8 | 94 |
| Dispersing Agent | 0.5 | 141.4 | 0.6 | 111.1 | 0.5 | 142 |
| Vehicle | 73.9 | — | 68.2 | — | 73.8 | — |
| TOTAL | 100.0 | | 100.0 | | 100.0 | |

| FORMULATION | 4 | | 5 | | 6 | | 7 | |
|---|---|---|---|---|---|---|---|---|
| | Weight Percent | Weight Ratio | Weight Percent | Weight Ratio | Weight Percent | Weight Ratio | Weight Percent | Weight Ratio |
| Refractory | | | | | | | | |
| Mexican Graphite | 1.2 | | | | | | | |
| German Graphite | 2.9 | | | | | | | |
| White Talc | | | | | | | | |
| Proprietary Mineral "A" | 27.5 | | 18.1 | | | | | |
| Zircon Flour | | | 18.1 | | | | | |
| Calcined Kaolinite | | | | | 42.0 | | | |
| Calcined Alumina | | | | | | | 28.0 | |
| TOTAL | 31.6 | 2.1 | 36.2 | 1.7 | 42.0 | 1.33 | 28.0 | 2.5 |
| Polymer | 1.0 | 66.7 | 1.1 | 54.3 | 1.3 | 42.1 | 0.9 | 79.6 |
| Dispersing Agent | 0.7 | 102.6 | 0.7 | 81.5 | 0.9 | 63.1 | 0.6 | 119.4 |
| Vehicle | 66.7 | — | 62.0 | — | 55.8 | — | 70.5 | — |
| TOTAL | 100.0 | | 100.0 | | 100.0 | | 100.0 | |

[1]Weight of liquid vehicle per unit weight of refractory, polymer, or dispersing agent.

EXAMPLE 2

Standard AFS tensile test samples were molded from a foundry mix made up of Port Crescent silica sand and 3.3 parts of an inorganic sand binder and 0.6 parts by catalyst (each per 100 parts of sand). A number of the test samples were coated with the formulation of Run No. 2 of the preceeding table and an additional number were coated with the formulation of Run No. 7. Additional samples were not coated for control and comparison purposes. Tensile strengths of the samples and hardnesses were then measured at day intervals as the sample were continually exposed to the atmosphere. The test results were as follows:

| Day | Cores Coated With Formulation 1 | | Cores Coated With Formulation 7 | | Untreated Cores | |
|---|---|---|---|---|---|---|
| | Tensile Strength[1] | Hardness[2] | Tensile Strength | Hardness | Tensile Strength | Hardness |
| 1 | 245 | 70 | 165 | 80 | 135 | 48 |
| | 190 | 65 | 190 | 80 | 135 | 52 |
| 2 | 185 | 67 | 210 | 85 | 175 | 59 |
| | 170 | 69 | 185 | 90 | 200 | 58 |
| 3 | 180 | 66 | 200 | 85 | 120 | 58 |
| | 240 | 68 | 260 | 83 | 155 | 65 |
| 6 | 180 | 69 | 215 | 84 | 185 | 50 |
| | 215 | 76 | 215 | 92 | 115 | 72 |
| 8 | 225 | 73 | 180 | 84 | 90 | 46 |
| | 215 | 72 | 220 | 85 | 115 | 44 |

[1]Tensile strength in psi.
[2]Measured on a scale of 0 to 100 where 0 denotes complete softness and 100 denotes complete hardness The retention of tensile strength by the cores treated with the two formulations in contrast to the untreated samples is particularly apparent beginning with Day 3 and is most dramatically shown by the tensile strength tests on Day 8.

The wash of our invention can be applied to the surfaces of cores and molds by any desired method such as brushing or spraying. The controlling factors for determining the amount of coating are, of course, the physical characteristics of the molds and cores and the shapes of the castings to be produced.

We claim:

1. a core and mold wash comprising:
   a. an organic liquid solvent having a kauri-butanol value of at least 36;
   b. a suspending agent;
   c. powdered refractory material selected from the group consisting of graphite, coke, mica, silica, aluminum oxide, magnesium oxide, talc, and zircon flour; and
   d. an organic polymer selected from the group consisting of vinyl toluene/butadiene copolymer, styrene/butadiene copolymer, vinyl toluene/acrylate copolymer, styrene/acetylene copolymers, and acrylates,
   the ratio by weight of organic polymer to organic liquid solvent being between about 1:50 and about 1:200 and the ratio by weight of powdered refractory to organic liquid solvent being between about 1:2.5 and 1:3.5.

2. A core and mold wash comprising:

a. liquid 1, 1, 1-tricloroethane;
b. a suspending agent;
c. powdered refractory material selected from the group consisting of graphite, coke, mica, silica, aluminum oxide, magnesium oxide, talc, and zircon flour; and
d. vinyl toluene/butadiene copolymer; the ratio by weight of vinyl toluene/butadiene copolymer to 1, 1, 1-trichloroethane being between about 1:50 and about 1:200 and the ratio by weight of said refractory to said 1, 1, 1-trichloroethane being between about 1:50 and about 1:200.

* * * * *